Dec. 12, 1939.   C. W. ISELER   2,182,988
ENGINE BALANCING
Filed Sept. 11, 1936   3 Sheets-Sheet 1
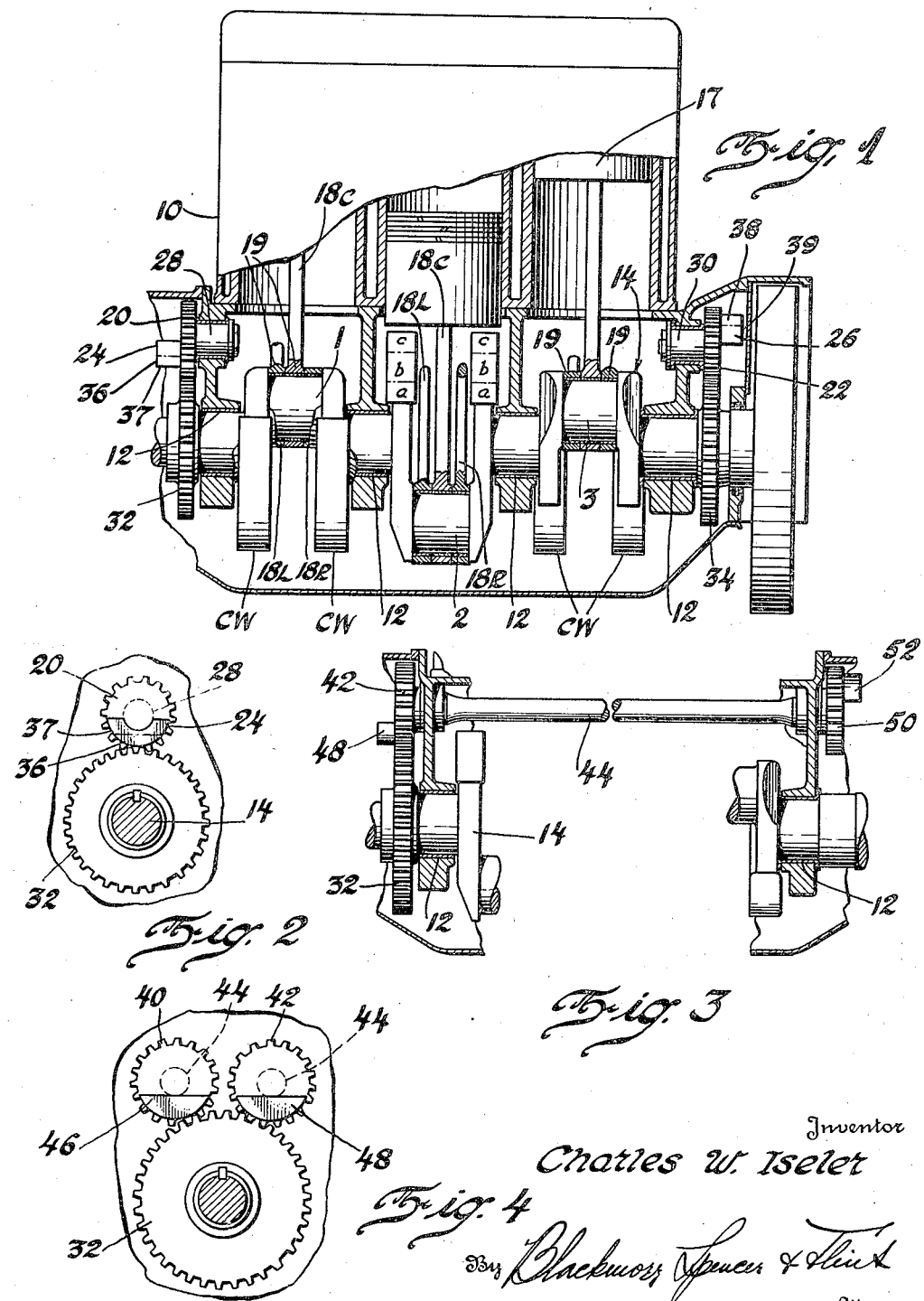
Inventor
Charles W. Iseler Dec. 12, 1939.  C. W. ISELER  2,182,988

ENGINE BALANCING

Filed Sept. 11, 1936  3 Sheets-Sheet 2

Inventor
Charles W. Iseler

By Blackmore, Spencer & Hirt
Attorneys

Dec. 12, 1939.  C. W. ISELER  2,182,988
ENGINE BALANCING
Filed Sept. 11, 1936  3 Sheets—Sheet 3

Inventor
Charles W. Iseler
By Blackmore, Spencer & Flint
Attorneys

Patented Dec. 12, 1939

2,182,988

UNITED STATES PATENT OFFICE 2,182,988

ENGINE BALANCING

Charles W. Iseler, Detroit, Mich., assignor to General Motors Corporation, Detroit, Mich., a corporation of Delaware Application September 11, 1936, Serial No. 100,263

2 Claims. (Cl. 74—604)

This invention relates to engine balancing means and more particularly to means for obtaining approximate or complete inertial force and couple balance in a W-type engine having nine cylinders.

It is an object of my invention to provide means for balancing an engine.

Another object of my invention is to provide balancing means for a W-type nine-cylinder engine.

A further object of my invention is to provide a means for obtaining partial or complete couple balance in a nine-cylinder W-type engine.

A still further object of my invention is to provide means for balancing a nine-cylinder W-type engine comprising weights fixed to the crankshaft or driven therefrom, some of the weights rotating at crankshaft speed and others adapted to rotate at twice crankshaft speed.

Still another object of my invention is an improved W-type nine-cylinder engine having better balance than those hitherto designed.

Other objects and advantages of my invention will become apparent from the detailed description.

It is well known that if an engine is not substantially balanced excessive vibration will result. Vibration greatly increases the wear of parts and reduces the life of an engine. Where the engine is used in a motor vehicle excessive vibration causes fatigue of the operator. It is therefore desirable to reduce unbalance to a minimum.

In general, any engine may be out of balance in two ways:
1. With respect to forces
2. With respect to couples.

The forces involved may be termed "primary," or those acting at engine speed, or "secondary," those at twice engine speed. The centrifugal forces in an engine can be readily balanced by means of counterweights attached to the crankshaft. The gas forces cannot be balanced and are left alone. The inertial forces, both primary and secondary, may be in balance due to the design of the engine or special balancing devices may be used. In my nine-cylinder W-engine the inertial forces, both primary and secondary, are balanced in themselves due to the design.

The unbalance due to couples may also be of two kinds, the primary or those at engine speed, and the secondary or those at twice engine speed. The couples may be centrifugal or inertial. The centrifugal couples can be balanced by counterweights fixed to the crankshaft, while to balance the inertial couples wholly or in part special devices must be used.

Reference is made to the accompanying drawings and description forming a part of the specification for a more complete understanding of my invention.

In the drawings:

Figure 1 is a longitudinal view partly in section of a nine-cylinder W-engine illustrating one form of construction in which complete inertial and centrifugal force balance and partial couple balance are obtained.

Figure 2 is an end view of a portion of the device of Figure 1 showing a balancing weight and driving means therefor.

Figure 3 is a modification of a device similar to Figure 1 in which shafts are used for driving the rear balancing weights.

Figure 4 is an end view of a portion of the device of Figure 3.

Figure 5:
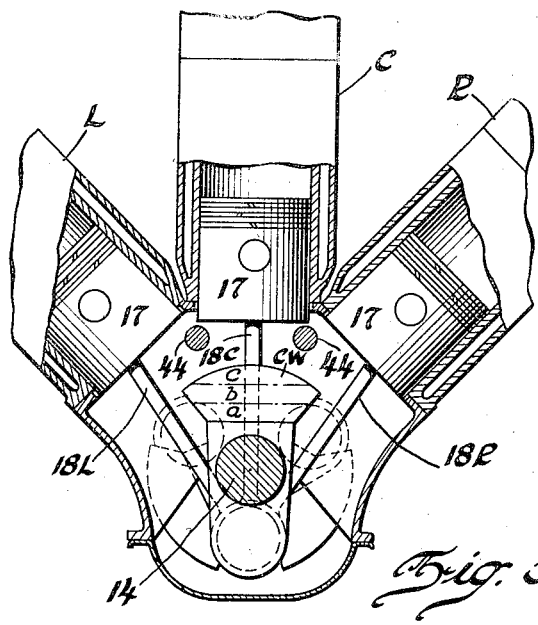
Figure 5 is an elevational view partly in section illustrating a piston in each of the three banks and showing counterweights attached to the crank cheeks.
Figure 6:
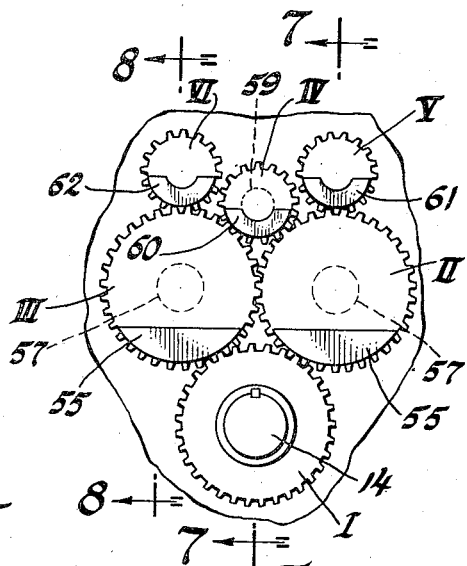
Figure 6 is a front elevational view of a modification of my invention showing an arrangement or combination of gears and weights used where one hundred per cent balance is desired.

In carrying out my invention I arrange the cylinders, pistons, and other reciprocating parts in three banks or planes, the central bank C, as illustrated in Figure 5, being at an angle of 45° with respect to the right bank R and to the left band L so that the banks L and R make a 90° angle with each other.

In the drawings 10 represents an engine having bearings 12, 12, etc., for the crankshaft 14. Three pistons 17 are joined by connecting rods 18L, 18C, and 18R with crankpin 1 as best seen in Figures 1 and 5. In the drawings the large ends 19, 19, etc., of the connecting rods are shown side by side on the crankpin. However, any suitable modified connection between the several rods and the crankpin may be used as will be readily understood, the crankpin acting as a journal or center of rotation for each rod end.

Each of crankpins 2 and 3 is similarly connected with three connecting rods leading to pistons, one in each bank. Thus, three pistons will be in each of the three banks of cylinders and each crankpin will act as a journal or center of rotation for three rods, one to a piston in each bank.

Figures 11, 12:
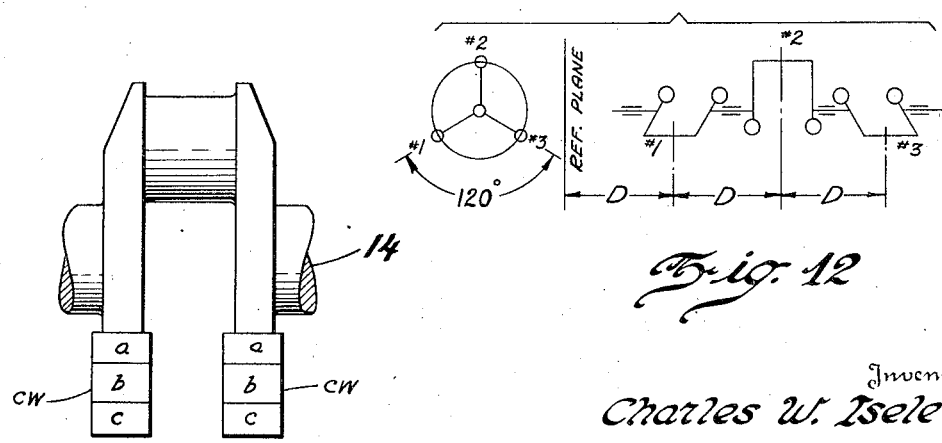
Figure 11 is a partly diagrammatic view of weights fixed to the crank cheeks to illustrate the several portions which make up each complete counterweight.
Figure 12 is a composite line drawing illustrating diagrammatically the crankshaft and crankpins thereon.

As best seen in Figures 5 and 12, the crankshaft 14 has its three crankpins 1, 2, and 3 arranged at 120° angles with each other. With such a crankshaft the primary and secondary inertial forces are balanced in themselves and no special balancing devices are needed. The following analysis will show that this is so.

Referring to the diagrammatic showing in Figure 12, the primary inertial forces at the several pins of the 120° crankshaft may be represented by the formulas:

$$\text{Crankpin } \#1 = -K \cos (\alpha + 240°)$$
$$\text{Crankpin } \#2 = -K \cos \alpha$$
$$\text{Crankpin } \#3 = -K \cos (\alpha + 120°)$$

where $K$=inertial force constant=$.0000284 \times W \times R \times N^2$.
$\alpha$=angle of crank rotation.
$W$=weight in pounds of pistons and upper ends of connecting rods.
$R$=crank radius in inches.
$N$=R. P. M.

Adding the primary inertial forces at the several pins as determined from the above equations it is found that the forces are equal to zero and hence no balancing means is necessary.

Similarly, the secondary inertial forces may be represented as follows:

$$\text{Crankpin } \#1 = -Kp \cos 2(\alpha + 240°)$$
$$\text{Crankpin } \#2 = -Kp \cos 2\alpha$$
$$\text{Crankpin } \#3 = -Kp \cos 2(\alpha + 120°)$$

where $K$=inertial force constant=$.0000284 \times W \times R \times N^2$.
$W$=weight in pounds of pistons and upper ends of connecting rods.
$N$=R. P. M.
$R$=crank radius in inches.

$$p = \frac{R}{L}$$

where $R$=crank radius in inches.
$L$=length of connecting rod in inches.
$\alpha$=angle of crankshaft rotation.

As in the case of the primary inertial force it is found that the summation of the forces at the several crankpins is equal to zero.

The unbalance due to the centrifugal forces of the unbalanced parts of the crankshaft such as crank cheeks, crankpins, and the lower ends of the connecting rods, may be balanced by counterweights fixed to the crank cheeks. In the drawings the portions of each counterweight marked $a$ represents a portion of the counterweight CW applied to each crank cheek sufficient to balance the crankshaft against centrifugal forces. By providing the counterweights $a$ referred to above, the centrifugal forces are balanced and no centrifugal couples are produced.

By arranging the banks of cylinders R and L at 90° to each other the primary inertial couples are balanced in a convenient manner. The value of the primary inertial couples may be represented by the formula:

$$Cp = -K \times D \times 1.732 \sin \alpha$$

where $K$=inertia constant.
$D$=distance between cylinders.
$\alpha$=angle of rotation of crankshaft.

Figure 10:
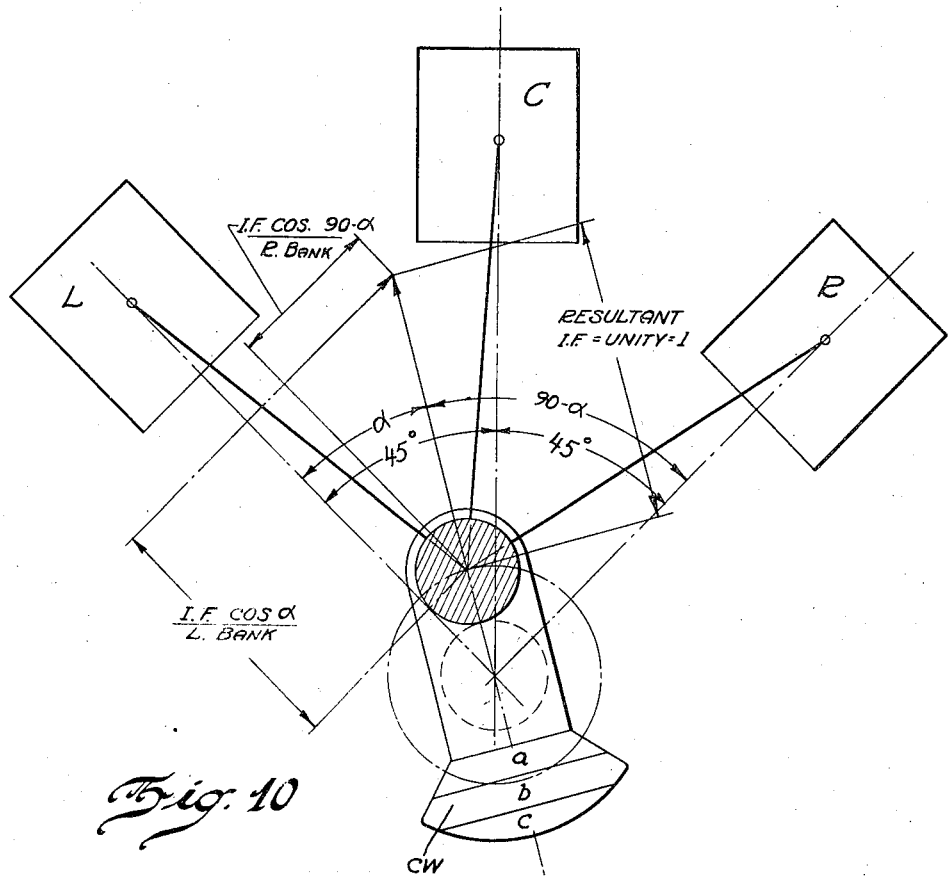
Figure 10 is a diagrammatic view illustrating vectorially that the primary inertial force balance in the left and right banks is equal to a constant value.

By arranging the banks R and L at an angle of 90° with respect to each other the forces on bank L are at 90° to corresponding forces on bank R and the vectorial sum of the forces in the banks R and L will always be unity, or of the same value regardless of the crank angle. This is illustrated in Figure 10 of the drawings. The inertial force times the cosine of angle $\alpha$ is the value of the component acting in a direction parallel to the bank L, while the inertial force multiplied by the cosine of 90—$\alpha$ is the value of the component in bank R. As the angle $\alpha$ changes with rotation of the crank the components in banks L and R will change but the vectorial sum will remain constant. The constant value of the inertial force can therefore be balanced by counterweights $b$ on the opposite ends of the crank cheeks. In the drawings the portion of the entire counterweight CW at each crank cheek sufficient to balance the inertial force of the banks R and L is indicated by $b$. Since the inertial force has been balanced at its source no primary couple will be produced in the banks R and L.

The primary inertial forces in the bank C may be partially balanced by means of the counterweights $c$. These counterweights are preferably of sufficient weight to balance one-half the inertial forces in the bank C. The unbalanced inertial force is reduced one-half and thus the inertial couple is reduced a like proportion. The use of the counterweights $c$ will add an additional horizontal force of about the same amount at 90° and 270° of crankshaft rotation. Hence it is not desirable to make the counterweight $c$ greater than about one-half the value of the unbalanced inertial force in the bank C. Where the counterweights $c$ are one-half the unbalanced inertial force, the unbalance consists of a primary inertial couple produced by one-half of one cylinder, or expressed in percentage the primary inertial couple is 83% balanced.

For many purposes such balancing is more than sufficient. If desired, the remaining roughness may be dampened by means of a suitable rubber mounting.

The counterweights $a$, $b$, and $c$ are fixed to the crank cheeks as explained and together make up the counterweights CW. These weights rotate at engine or crankshaft speed since they are fixed thereto and constitute primary balancing means. It will be understood that the counterweights CW will preferably be made integral and of a weight equal to the summation of the several portions $a$, $b$, and $c$.

In addition to the primary couples, each bank of cylinders has a secondary inertial couple which may be expressed by the formula:

$$C_{(sec)} = -KpD \times 1.732 \sin 2\alpha$$

where

K=inertial constant.

$$p = \frac{R}{L}$$

where

R=crank radius.
L=crank length.
D=distance between cylinders in inches.
α=crank angle.

As in the case of the primary couple, the inertial forces of the right and left cylinders are at 90° to each other and can be combined into a force with a constant value. Thus the couple produced by these forces will have a constant value. They are, however, rotating about the crankshaft center so that the result will be a rotating couple of constant value at twice engine speed. They can be replaced by another rotating couple of constant value but 180° from the former to balance it.

By a well known principle of mechanics any couple can be translated into any parallel position in its plane or a parallel plane without changing its external effect upon the body on which it acts. By providing gears 20 and 22 (Figures 1 and 2) at opposite ends of the crankshaft with counterweights 24 and 26 respectively, a balancing couple can be produced which will balance the secondary inertial couples existing in the banks R and L. Gears 20 and 22 are mounted for rotation on stub shafts 28 and 30 respectively, and are driven at twice engine or crankshaft speed by engagement with crankshaft gears 32 and 34 fixed to the front and rear of the crankshaft, gears 20 and 22 being of one size and gears 32 and 34 of twice the size of gears 20 and 22. The weights 24 and 26 are displaced 180° from each other and provide a balancing rotating couple to substantially completely balance the secondary couple of the banks L and R.

The secondary inertial couple in the bank C is not a rotating couple but is a couple acting in a vertical plane. It will, therefore, have to be balanced by two vertical forces, acting in opposite directions and at a distance from each other, which change with the cosine of the crank angle. As in the case of the primary forces and couples, the secondary forces and resultant secondary couples can be balanced one-half by the use of a counterweight at each end of a balancing shaft. The remaining half may be left unbalanced.

For balancing one-half the secondary inertial forces of the bank C the weights 36 and 38 are also fixed to gears 20 and 22 respectively, the weights 24 and 36 together constituting a counterweight 37 at one end of the engine and the weights 26 and 38 similarly a counterweight 39 at the other end, said counterweights 37 and 39 being displaced 180° from each other. As in the case of the counterweights fixed to the crank cheeks the counterweights 24 and 36 which make up the counterweight 37 will preferably be of one piece construction.

As in the case of the primary inertial couple the secondary inertial couple will be approximately 83% in balance and rubber mountings may be used to dampen vibration.

Where it may not be desirable to provide two crankshaft gears the modification of Figures 3 and 4 may be used. Crankshaft gear 32 engages with two gears 40 and 42, each of the latter two gears having one-half as many teeth as gear 32 in order that they will be driven at twice engine speed. Each of gears 40 and 42 is fixed to shafts 44, said shafts being adapted to lie in the clear alleys between the several cylinder banks. Gears 40 and 42 carry counterweights 46 and 48 respectively of the same weight, each weight being composed of portions to balance completely the secondary inertial force of the banks R and L and to balance one-half the inertial force of the bank C. Each of the two shafts 44, 44 may have gears or other supporting means 50 at the opposite end having weights 52 equal to the weights of counterweights 46 and 48 but displaced 180° therefrom. As in the case of the single eccentric weight at each end of the crankshaft used in the modification of Figures 1 and 2, the secondary inertial couples of banks L and R will be completely balanced and one-half of the secondary inertial couples of the bank C.

Where complete balance of both the primary and secondary inertial couples is desired in addition to complete centrifugal force balance and inertial force balance, the arrangement illustrated in Figures 6-9 inclusive is used. As in the modifications of Figures 1-5 inclusive the centrifugal balance will be obtained by providing weights $a'$, see Fig. 7, on the crank cheeks sufficient to balance the centrifugal forces due to the crank cheeks, crankpins and the lower ends of connecting rods.

Figure 7:
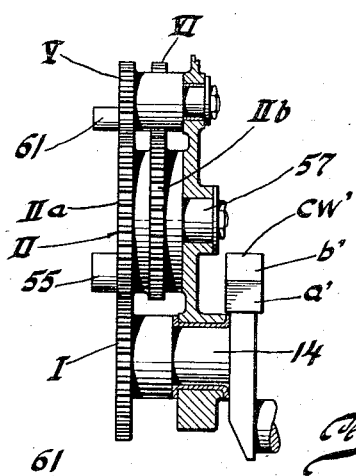
Figure 7 is a longitudinal view, partly in section, of the modification illustrated in Figure 6, including a portion of the crankshaft with balancing weights fixed thereto substantially on the line 7—7 in Figure 6.
Figure 8:
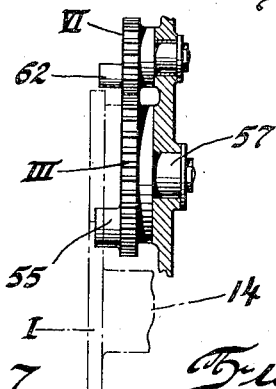
Figure 8 is a view, partly in section, on the line 8—8 in Figure 6 looking in the direction of the arrows.

Likewise, as in the modifications of Figures 1-5 inclusive the primary inertial couples of the banks R and L can be balanced by means of additional weights $b'$, see Fig. 7, fixed to the crank cheeks since the inertial force is constant due to the 90° design of the two banks. The two weights $a'$ and $b'$ make up the combined counterweight CW' added to each crank cheek.

In order to completely balance the primary unbalanced couple of bank C and the secondary couples of banks R, C, and L, the gears II and III (Figures 6, 7, and 8) rotating at crankshaft speed but in opposite directions are provided. Each gear has an eccentric weight 55 fixed thereto. Gear I fixed to crankshaft 14 engages with and drives gear II which is composed of two parts IIa and IIb having an equal number of teeth. Portion IIa engages gear I while portion IIb which is directly behind IIa engages and drives gear III which has the same number of teeth as gear II. Thus gears II and III rotate at crankshaft speed but in opposite directions. Gears II and III are adapted to rotate on stub shafts 57.

Gear IV mounted on stub shaft 59 engages and is driven by gear II, the arrangement being such that gear IV is rotated at twice crankshaft speed. Similarly the gears V and VI engage with the gears II and III respectively and are driven thereby at twice crankshaft speed. Eccentric weights 60, 61, and 62 are mounted on gears IV, V, and VI respectively.

Figure 9:
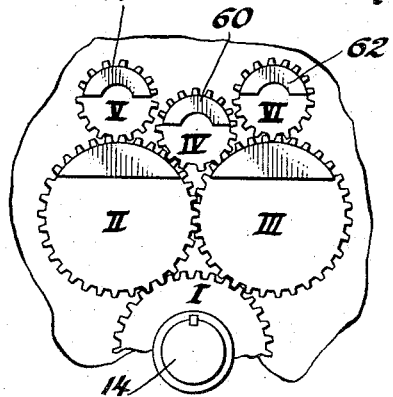
Figure 9 is an end view of the modification of my invention illustrated in Figure 6 but taken from the opposite end of the engine to that of Figure 6.

As seen in Figure 9 a set of gears and eccentric weights similar to the gears and weights thereon are driven from the opposite end of the crankshaft. These gears and weights are represented by like reference characters and numerals to similar parts in Figure 6. As seen in Figure 9 the weights on rear gears II-VI inclusive are displaced 180° from those at the front end.

In the operation of the engine using the balancing means of Figures 6-9 inclusive, gears II and III and eccentric weights thereon at the front and rear of the crankshaft operate similar to a Lanchester balancer at engine speed. This mechanism wil balance the unbalanced couple of bank C.

Gear IV and attached eccentric weights at opposite ends of the crankshaft driven at twice engine speed will completely balance the secondary inertial couple of banks L and R.

Gears V and VI and attached eccentric weights at each end of the crankshaft driven at twice engine speed in opposite directions act in the manner of a Lanchester balancer at twice engine speed and balance the secondary inertial couple of bank C.

Thus in the form of the invention illustrated in Figures 6-9 inclusive a completely balanced W-type nine-cylinder engine is provided.

Due to the large number of gears used in the modification of Figures 6-9 inclusive it may be desirable to make at least a portion of the gears of celoron or similar material which will reduce the noise of the gears and make for quieter operation.

One firing order that may be used in my W-type engine is the following: 1L, 1R, 2C, 3L, 3R, 1C, 2L, 2R, 3C, 1L, etc. In using this firing order the interval between the several explosions will be as follows: 90° between 1L and 1R; 75° between each of 1R and 2C, and 2C and 3L; 90° between 3L and 3R; 75° between each of 3R and 1C, and 1C and 2L; 90° between 2L and 2R; and 75° between each of 2R and 3C, and 3C and 1L.

I am aware that many changes may be made in the form and disposition of the various parts without departing from the spirit of my invention and therefore I do not desire to limit the patent granted thereon except as necessitated by the prior art.

I claim:

1. In a nine-cylinder W-engine the combination which includes cylinders arranged in three banks, the central bank being at a 45° angle with respect to right and left banks, pistons and connecting rods for each cylinder, a three-throw crankshaft having crankpins at 120° intervals, weights fixed to the crank cheeks to maintain centrifugal balance, additional weights fixed to the crank cheeks to balance primary inertial couples of the right and left banks, a crankshaft gear at each end of the crankshaft, a pair of gears having eccentric weights thereon driven from each of said crankshaft gears at crankshaft speed but in opposite directions for completely balancing primary inertial couples in the central bank, the weights on one of said pair of gears being displaced 180° with respect to the other pair, a second pair of gears at each end of the crankshaft having eccentric weights thereon driven by said first pairs of gears at twice crankshaft speed, the eccentric weights on one of said second pairs being displaced 180° from those on the other of said second pairs so that secondary inertial couples in the right and left banks will be balanced, and two other gears having eccentric weights thereon to completely balance the secondary inertial couple of the central bank, one of said latter two gears being driven by one of said first mentioned pair of gears and the other of said latter two gears being driven by the second of said first mentioned pair of gears at twice crankshaft speed, the eccentric weights being displaced 180° from each other.

2. In a nine cylinder W-type engine the combination which includes, cylinders arranged in right, left, and central banks, the right and left banks each being at an angle of 45° with respect to the central bank, each bank having three cylinders, a piston in each cylinder adapted to reciprocate, a three throw crankshaft having three crankpins arranged at 120° intervals, connecting rods connecting the pistons and crankpins, weights fixed to the crank cheeks to maintain complete centrifugal balance, additional weights fixed to the crank cheeks to balance completely the primary inertial couples of the reciprocating parts of the right and left banks, further weights rotated by the crankshaft at crankshaft speed for balancing at least a substantial portion of the primary inertial couples of the reciprocating parts of the central bank, eccentric weights at each end of the crankshaft, and gearing connecting the eccentric weights and crankshaft to cause the eccentric weights to be driven by the crankshaft at twice the speed of the crankshaft, the eccentric weights at one end of the crankshaft being displaced 180° from those at the opposite end and said eccentric weights completely balancing the secondary inertial couples of the right and left banks and at least substantialy balancing the secondary inertial couples of the central bank.

CHARLES W. ISELER.